United States Patent [19]

Sugimori et al.

[11] Patent Number: 4,882,628
[45] Date of Patent: Nov. 21, 1989

[54] AMPLITUDE CHARACTERISTICS OF TV VERTICAL FREQUENCY SIGNAL

[75] Inventors: Yoshio Sugimori; Yousai Araki; Tadao Kurosaki; Joji Urano, all of Tokyo, Japan

[73] Assignee: Nippon Television Network Corporation, Tokyo, Japan

[21] Appl. No.: 299,377

[22] Filed: Jan. 23, 1989

[30] Foreign Application Priority Data

Oct. 31, 1988 [JP] Japan .................................. 63-275382

[51] Int. Cl.$^4$ ..................... H04N 5/213; H04N 5/208; H04N 9/64
[52] U.S. Cl. .................................... 358/167; 358/166; 358/37
[58] Field of Search .................. 358/37, 166, 167, 105

[56] References Cited

U.S. PATENT DOCUMENTS

| | | | |
|---|---|---|---|
| 4,587,576 | 5/1986 | Hirota et al. | 358/166 |
| 4,635,120 | 1/1987 | Ichinoi | 358/166 |
| 4,677,461 | 6/1987 | Migutani et al. | 358/166 |
| 4,706,113 | 11/1987 | Ito et al. | 358/166 |
| 4,792,854 | 12/1988 | Glenn | 358/167 |

Primary Examiner—John K. Peng
Attorney, Agent, or Firm—Sughrue, Mion, Zinn, Macpeak and Seas

[57] ABSTRACT

A amplitude characteristics of TV vertical frequency signal is improved by operating amplitudes of luminance signal obtained from a horizontal scan in a field and luminance signals obtained from a preceding and a subsequent horizontal scans in the same field and those luminance signals obtained in a preceding field, simultaneously.

3 Claims, 3 Drawing Sheets

AMPLITUDE CHARACTERISTICS OF TV VERTICAL FREQUENCY SIGNAL

BACKGROUND OF THE INVENTION

The present invention relates to a system for improving a characteristics of an output signal of a TV camera in such a way that a vertical resolution thereof on a screen of a TV receiver the output signal can be improved.

The NTSC color TV system has been used in, particular, U.S.A. and Japan, and various proposals have been made on a transmitter and a receiver to obtain a higher quality of image.

It has been known that, in order to compensate for vertical resolution on a TV receiver, a signal processing circuit is provided in a transmitter side for processing an output signal of a TV camera so that a processed video signal is transmitted. An example of such signal processing circuit is one called as a detail correction circuit a construction of which is shown in FIG. 4. In FIG. 4, the detail correction circuit connected to a TV camera 1 includes a matrix circuit 2 having inputs connected to red, green and blue color outputs of the TV camera 1 and adapted to perform a matrix operation of these color signals, series connected delay lines 5-1 and 5-2 each providing one horizontal scan time (H) delay, the delay line 5-1 being adapted to receive luminance signal (Y) on a line 3, multipliers 6-1, 6-2 and 6-3 for multiplying signals at an input of the delay line 5-1, at a junction between the delay lines 5-1 and 5-2 and at an output of the delay line 5-2 with respective coefficients to be described later, respectively, an adder 7 for adding outputs of the multipliers 6-1, 6-2 and 6-3 and a matrix circuit 8 which is an opposite circuit to the matrix circuit 2 and receives I and Q signals on lines 4-1 and 4-2 and an output of the adder 8. An output of this detail correction circuit is shown by a numeral 9 as which an output signal of the TV camera 1 compensated for vertical resolution is provided.

It is known that the resolution of the TV camera is checked by means of the so-called inmegachart on which a test pattern is given. The test pattern includes a number of fine parallel black lines extending vertically on a white background. For the check of horizontal resolution, the test pattern is scanned horizontally in normal direction to the vertical black lines. Then the inmegachart is turned by 90° and the vertical resolution is checked by moving the camera vertically within a limited distance. Since the number of scan lines is 525 in the NTSC system, a monochromatic pattern obtained by scanning this chart includes 262,5 (525/2) periods per image screen. Therefore, it corresponds to the number of periods within a vertical height (H) of the image screen and is usually represented CPH (Cycle Per Height) unit. The value of (525/2)CPH means a most severe condition to obtain such monochromatic image and, since a repetition rate of horizontal scan lines is 15.75 KHz, a multiplied value is usually referred to as vertical frequency. In checking the amplitude characteristics in a direction normal to the camera movement, O CPH is made correspondent to O dB. Thus, a monotoneously decreasing characteristics curve a in FIG. 5 is obtained. Since, in obtaining a video signal from the camera, one field is constituted with 262.5 scan lines which is a half of 525 lines and alternative lines are scanned in a next field, the vertical amplitude characteristics, when only one field is concerned, in a range higher than (525/4) CPH is not enough to express the signal an an image. Therefore, the characteristics curve a is compensated such that a characteristics curve b is obtained. That is, the signals RGB from the camera 1 are converted by the matrix circuit 2 into the Y, I and Q signals and a compensation is performed for the Y signal among them. Since band widths of the I and Q signals are narrow, compensation for them is not performed. The compensation for the luminance signal Y is to provide a peak around (525/4)CPH as shown by the curve b in FIG. 5. In order to realize this compensation, the original signal is supplied to the multiplier 6-1, the original signal delayed by one horizontal scan time (H) is supplied to the multiplier 6-2 and the original signal delayed by two horizontal scan time (2H) is supplied to the multiplier 6-3. A multyiplying coefficient a1 of the multiplier 6-2 is selected as being larger than 1 and a mulitplying coefficient a2 of the multipliers 6-1 and 6-3 is selected as being equal to or smaller than 0 so that the following equation is established.

$$a1 + 2a2 = 1.0 \quad (1)$$

The equation (1) means that a d.c. signal level is constant (O dB at frequency 0). Since a current scan line is amplified by 1 or more and a preceding and subsequent scan lines are inverted in phase and added, a characteristics curve which is symmetrical about (525/4)CPH is obtained. The coefficients necessary to provide the curve b in FIG. 5 are $a1 = 1.2$ and $a2 = -0.1$.

Since this compensation for the signal Y is performed with respect to the characteristics signal of only the camera, the curves a and b in FIG. 5 are multiplied with each other, resulting in a curve c in the same figure, which has a peak around $[(525/4) \times (2/3)]$CPH.

However, it has been found that the characteristics shown by the curve c is not enough to practically improve the resolution. Particularly, it is insufficient for an image portion containing signal components of high frequency band.

SUMMARY OF THE INVENTION

An object of the invention is to provide a compensation system for improving resolution to the practically usable extent by means of a relatively simple circuit construction.

According to the present invention, the above object is achieved by a system for improving the amplitude characteristics of TV vertical frequency signal by operating amplitude of luminance signal obtained from a horizontal scan in a field and amplitudes of luminance signals obtained from a preceding and a subsequent horizontal scans in the same field, wherein these luminance signals and those obtained in a preceding field are processed in an operation processing portion.

DETAILED DESCRIPTION OF THE PREFERRED EMBODIMENT

Figure 1:
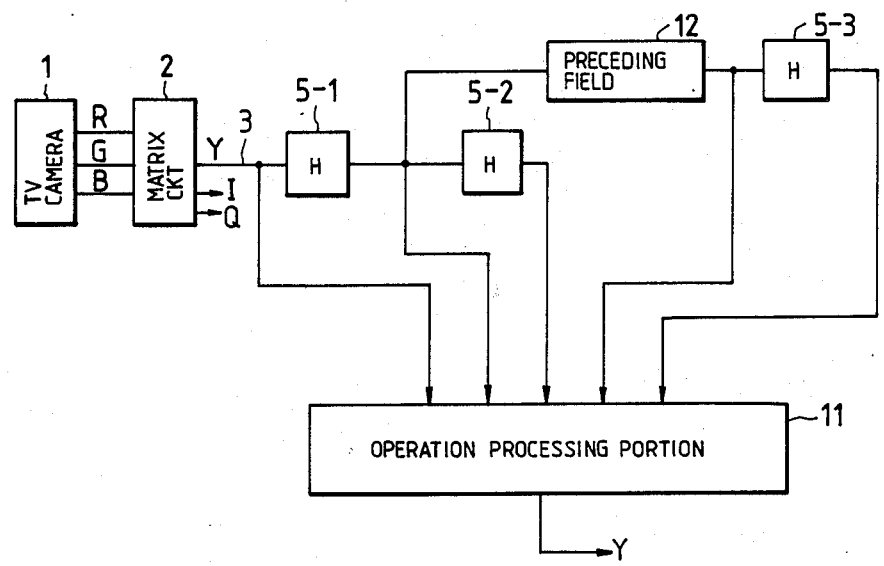
FIG. 1 is a block circuit diagram showing a principle of the present invention.

In FIG. 1 which shows a principle of the present invention, a reference numeral 1 depicts a TV camera an output of which is connected to a matrix circuit 2. Amount outputs I, Q and luminance signal Y obtained from the matrix circuit 2, only the latter is supplied to a one horizontal scan time (H) delay line 5-1 and to a signal operation portion 11. An output of the delay line 5-1 is supplied to another one horizontal scan time delay line 5-2, the signal operation portion 11 and a circuit 12 which functions to derive a luminance signal obtained in a scan of a preceding field. That is, the circuit 12 may be a delay circuit capable of delaying a signal by a time period of 262H corresponding to one field. An output of the circuit 12 is connected to a still further one horizontal scan time delay line 5-3 and to the signal operation portion 11. An output of the third delay line 5-3 is supplied to the signal operation portion 11.

Figure 2:
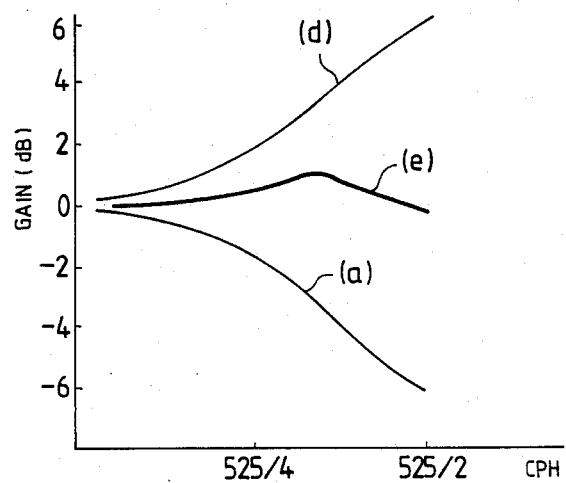
FIG. 2 is a graph for explaining an operation of the circuit shown in FIG. 1.

The signal operation portion 11 recives the original luminance signal Y, that delayed by 1 H and that delayed by 2 H as in the conventional system. According to the present invention, the signal operation portion receives, in addition thereto, a luminance signal of a preceding field and that delayed by 1 H. The signal operation portion is designed such that a total characteristics thereof becomes such as shown by a curve d in FIG. 2 so that the characteristics of the TV camera 1 such as shown by a curve a in the same figure is compensated thereby, resulting in a curve e.

Figure 3:
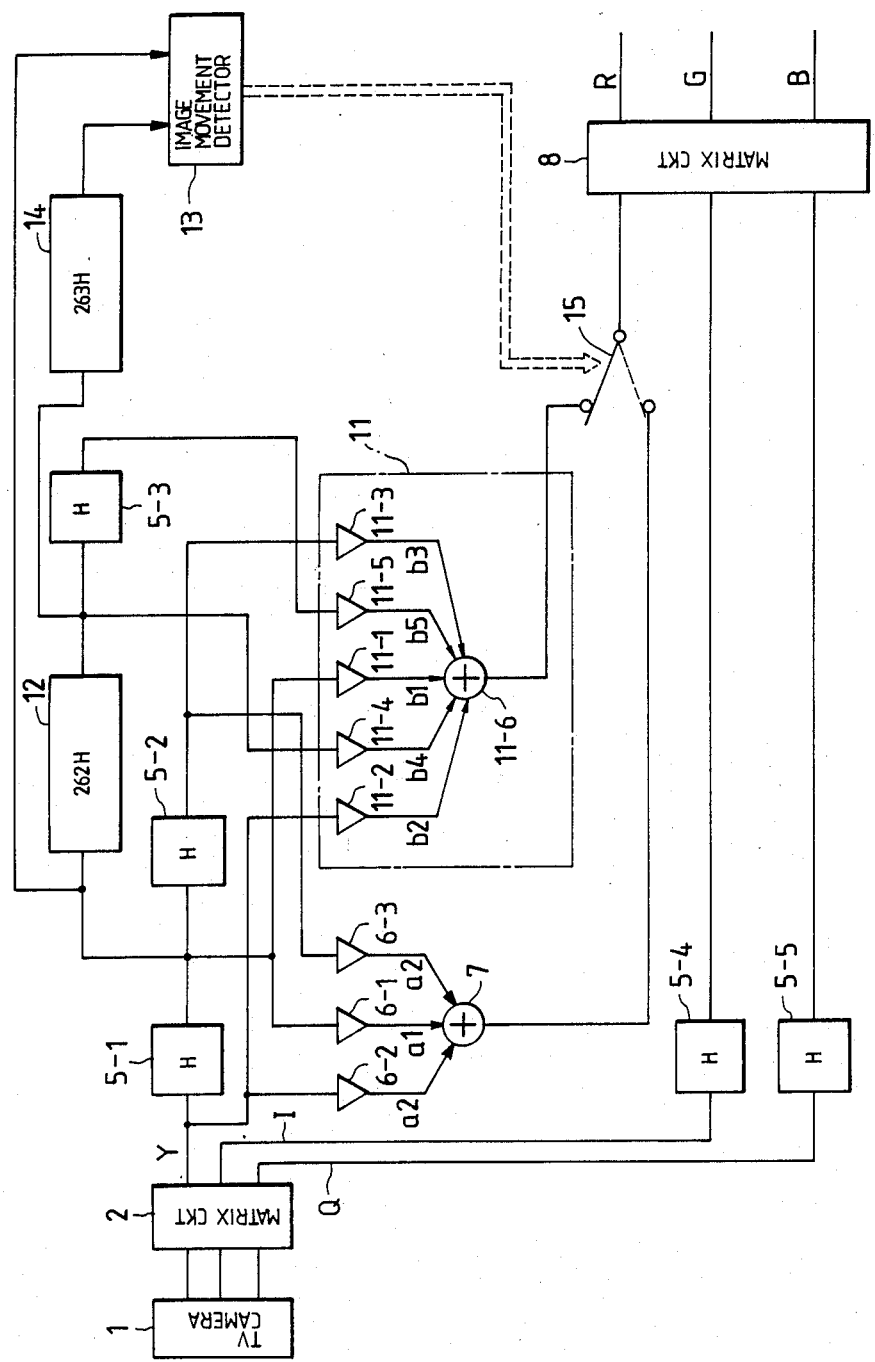
FIG. 3 is a detailed circuit diagram of the block circuit in FIG. 1.

FIG. 3 shows an embodiment realizing the basic construction shown in FIG. 1 with the signal operation circuit 11 being shown in detail. In FIG. 3, the signal operation portion 11 includes five identical multipliers 11-1, 11-2, 11-3, 11-4 and 11-5 and an adder 11-6 connected to outputs of the multipliers. Multiplying coefficients of the respective multipliers 11-1 to 11-5 are b1, b2, b3, b4 and b5, respectively.

The original luminance signal Y is supplied to the multiplier 11-2, that delayed by 1H by the delay line 5-1 is supplied to the multiplier 11-1 and that delayed by 2H is supplied to the multiplier 11-3. An output of the delay circuit 12 is supplied to the multiplier 11-4 and the same output delayed by 1H by the delay line 5-3 is supplied to the multiplier 11-5.

The output of the delay circuit 12 is also connected to a delay circuit 14 capable of elaying an input by 263H.

The original luminance signal Y and an output of the delay circuit 14 are supplied to a detection circuit 13 for detecting a movement of an image.

Figure 4:
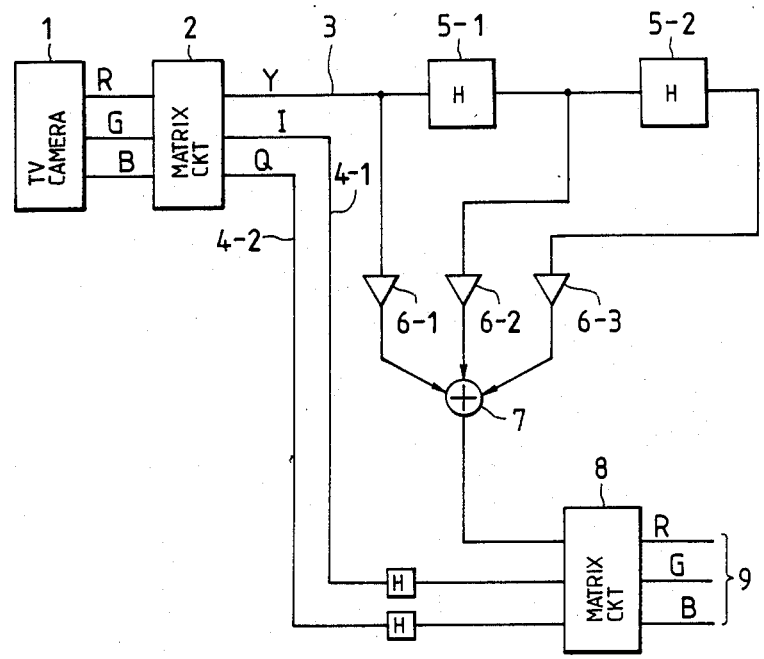
FIG. 4 is a block circuit of a conventional compensation system.
Figure 5:
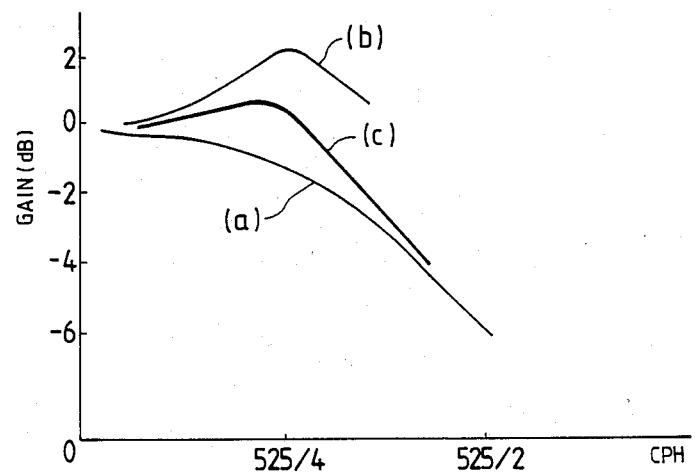
FIG. 5 is a characteristics of the system shown in FIG. 4.

Multipliers 6-1 to 6-3 and an adder 7 and their connections are the same as those shown in FIG. 4.

The values of b1 to b3 are selected to satisfy $b1 > 1.0$ $b2, b3 < 0$ as in the coefficients a1 and a2 in FIG. 4. For example, when $b1 = 1.56$ $b2, b3 = -0.37$ $b4 = 0.09$ the gain-CPH characteristics of the signal operation circuit 11 becomes as shown by the curve d in FIG. 2. This compensation will be referred to as "inter-field" compensation which compensates for the characteristics of the camera shown by the curve a in FIG. 2 to obtain the characteristics shown by the curve e in the same figure. The characteristics curve e shows a gain of 0dB or high around (525/3) CPH.

The original liminance signal Y is compared by the detection circuit 13 with a signal of the preceding frame to determine whether or not there is a correlation therebetween. The detection circuit 13 provides an output signal when it is decided by a circuit for operating a detected difference that the image is moving, upon which a switch 15 is switched from a position shown by a solid line in which the inter-field compensation is performed to a position shown by a dotted line to perform the conventional "inter-field" compensation.

That is, the present system performs the inter-field compensation when the image included in the video signal is substantially stationary and the in-field compensation when the image is moving. Therefore, the characteristics compensated by the present invention shows the signal peak in a higher frequency region that obtained by the TV camera whose characteristics is compensated. In other words, the present invention further improve the characteristics in the high frequency range which was impossible by the conventional compensation. This is proved by the fact that an area below the frequency vs. gain characteristics curve obtained at the output of the present compensation circuit is very large.

What is claimed is:

1. An amplitude characteristics improving system for vertical TV frequency signal, comprising first means for operating amplitudes of a luminance signal obtained by a matrix operation of an output signal of a TV camera, a first signal obtained by delaying said luminance signal by one horizontal scan time and a second signal obtained by delaying said luminance signal by two horizontal scan time, second means for operation said luminance signal, said first signal, said second signal, a third signal obtined by delaying said luminance signal by one field and one horizontal scan time and a fourth signal obtained by delaying said luminance signal by one field and two horizontal scan time and third means responsive to an output of either said first means or said second means to provide an improved vertical TV frequency signal.

2. The system claimed in claim 1, wherein said second means comprises a plurality of multipliers corresponding in number to said luminance signal and said first to fourth signals, said multiplier corresponding to said first signal having a multiplying coefficient larger than unity and two of the remaining multipliers having a multiplying coefficient smaller than 0, and an adder for adding outputs of said multipliers.

3. The system claimed in claim 2, wherein the multiplying coefficients of said multipliers corresponding to said third and said fourth signal are positive.

* * * * *